US012791770B2

(12) United States Patent
Seydel et al.

(10) Patent No.: US 12,791,770 B2
(45) Date of Patent: Nov. 10, 2026

(54) ARTICLE INCLUDING AN OPTICAL ELEMENT

(71) Applicant: VIAVI SOLUTIONS INC., Chandler, AZ (US)

(72) Inventors: Johannes P. Seydel, Petaluma, CA (US); Kangning Liang, Santa Rosa, CA (US); Jaroslaw Zieba, Santa Rosa, CA (US); Bradley John Ward, Pittsford, NY (US); Hung Xuan Nguyen, Santa Rosa, CA (US); Tasso R. M. Sales, Rochester, NY (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 282 days.

(21) Appl. No.: 18/447,156

(22) Filed: Aug. 9, 2023

(65) Prior Publication Data

US 2025/0052932 A1 Feb. 13, 2025

(51) Int. Cl.
*G02B 5/02* (2006.01)
*G02B 7/00* (2021.01)

(52) U.S. Cl.
CPC ......... *G02B 5/0226* (2013.01); *G02B 5/0268* (2013.01); *G02B 7/008* (2013.01)

(58) Field of Classification Search
CPC ..... G02B 5/0226; G02B 5/0268; G02B 7/008
See application file for complete search history.

(56) References Cited

U.S. PATENT DOCUMENTS 5,773,196 A 6/1998 Shih
5,851,411 A 12/1998 An et al.
6,266,476 B1 * 7/2001 Shie ...................... F21S 43/249 359/566
6,693,748 B1 2/2004 Fujimoto et al.
6,871,982 B2 3/2005 Holman et al.
8,823,254 B2 9/2014 Ohta et al.
9,070,850 B2 * 6/2015 Keller ................ H10H 20/8506
11,287,105 B2 3/2022 Nakabayashi et al.
11,754,758 B2 * 9/2023 Farys ...................... C23C 16/56 359/599
2009/0040772 A1 2/2009 Laney
2009/0153974 A1 * 6/2009 Sales .................... G02B 3/0043 359/599
2010/0015398 A1 1/2010 Kaminaga et al.
(Continued)

FOREIGN PATENT DOCUMENTS

JP 2004069790 A 3/2004
WO WO-2015015693 A1 * 2/2015 ............. B29C 33/42
WO 2020257505 A1 12/2020

OTHER PUBLICATIONS

John Howell et al., "Thermal Radiation Heat Transfer", 6th edition, Year 2016, 1 page.

(Continued)

*Primary Examiner* — Lucy P Chien
(74) *Attorney, Agent, or Firm* — Mannava & Kang, P.C

(57) ABSTRACT

An article includes a substrate having a first surface and a second surface opposite the first surface; and an optical element on the first surface of the substrate, the optical element comprising an optics region. The first surface of the substrate includes an outer region that extends a distance past the periphery of the optics region. A method of making the article and a method of singulating are also disclosed.

19 Claims, 5 Drawing Sheets

10

(56) References Cited

U.S. PATENT DOCUMENTS

| | | | |
|---|---|---|---|
| 2011/0033672 | A1 | 2/2011 | Yang et al. |
| 2014/0084519 | A1 | 3/2014 | Porro et al. |
| 2015/0306792 | A1 | 10/2015 | Miyazawa et al. |
| 2015/0378252 | A1 | 12/2015 | Lee et al. |
| 2017/0017091 | A1 | 1/2017 | Lee et al. |
| 2017/0157836 | A1 | 6/2017 | Miyazawa |
| 2017/0282419 | A1 | 10/2017 | Hayashi et al. |
| 2019/0064656 | A1 | 2/2019 | Ho et al. |
| 2022/0066316 | A1 | 3/2022 | Kobayashi et al. |
| 2022/0283496 | A1 | 9/2022 | Lai et al. |
| 2023/0213726 | A1 | 7/2023 | Graff et al. |
| 2023/0356438 | A1 | 11/2023 | Almeida et al. |
| 2023/0358925 | A1 | 11/2023 | Almeida et al. |

OTHER PUBLICATIONS

Zhou et al., "Thin Layer broadband porous chromium black absorber fabricated through wet-etching process", Royal Society of Chemistry, May 10, 2019, 17 pages.

Wikipedia contributors, "Collimated beam", Wikipedia, The Free Encyclopedia, Jul. 23, 2025, 4 pages. Downloaded from the Internet on Jul. 31, 2025.

Korean Ministry of Intellectual Property, "including English translation of Notice to Submit Response for Application No. 10-2024-0101095", dated Dec. 16, 2025, 8 pages.

* cited by examiner

ARTICLE INCLUDING AN OPTICAL ELEMENT

FIELD OF THE DISCLOSURE

The present disclosure generally relates to articles, such as optical devices, and methods of making the articles.

BACKGROUND

Typically, when combining two layers of materials with different coefficients of thermal expansion (CTE) and/or when combining a cross linkable (polymer) material layer on top of a solid substrate material, such as glass, where the top layer shrinks during crosslinking, stress builds up between the two material layers leading to a curvature of the layer stack. Having a difference in CTE between the layers, temperature changes in device operation, as verified by thermal cycling tests, lead to further stress enhancement and risk of substrate crack initiation/propagation, delamination and/or cracking of the top layer. This can lead to reliability problems in articles, such as optical devices or other devices that employ a layered stack of such materials.

What is needed is an article, such as an optical device, that employs a novel design and/or techniques of making such articles, which can reduce stress build up between the layers and/or improve durability of the device.

BRIEF DESCRIPTION OF THE DRAWINGS

Features of the present disclosure are illustrated by way of example and not limited in the following figure(s), in which like numerals indicate like elements, in which.

SUMMARY

Figure 1:
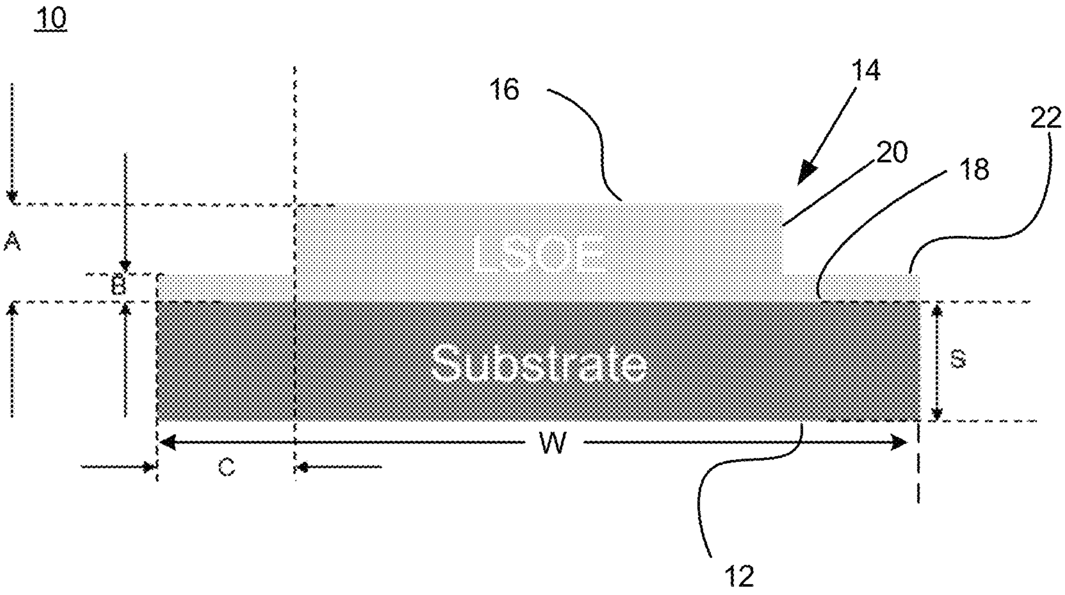
FIG. 1 illustrates a schematic cross-sectional view of an optical device, according to an aspect of the present disclosure.

In an aspect, there is disclosed an article. The article comprises a substrate having a first surface and a second surface opposite the first surface; and an optical element on the first surface of the substrate, the optical element comprising an optics region. The first surface of the substrate includes an outer region that extends a distance past the periphery of the optics region.

In another aspect, there is disclosed a method of making a plurality of articles on a substrate. The method comprises depositing a layer for forming a plurality of optics regions on a first surface of a substrate, each of the optics regions corresponding to one of the plurality of articles; and thinning a portion of the layer to form thinned areas between the plurality of optics regions.

In yet another aspect, there is disclosed a method of singulating. The method comprises: thinning a portion of a layer to form thinned areas between a plurality of device regions on a substrate; and severing the substrate in the thinned areas to form singulated devices.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

DETAILED DESCRIPTION

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Additionally, the elements depicted in the accompanying figures may include additional components and some of the components described in those figures may be removed and/or modified without departing from the scope of the present disclosure. Further, the elements depicted in the figures may not be drawn to scale and thus, the elements may have sizes and/or configurations that differ from those shown in the figures.

It is to be understood that both the foregoing general description and the following detailed description are exemplary and explanatory only, and are intended to provide an explanation of various embodiments of the present teachings.

The present disclosure is directed to articles, such as optical devices, comprising an optical element (e.g., a Light Shaping Optical Element (LSOE)) having a functional edge that has certain advantages. The advantages may include, for example, one or more of the following: allowing wider materials selection for the optical element; protecting an optical element on a substrate against delamination; reducing risk of internal cracking of the optical element; enhancing reliability of the optical device without affecting optical performance; enhancing reliability of the optical device in the packaging without affecting optical performance; reducing stress due to polymer crosslinking shrinkage of the optical element; reducing stress due to thermal expansion mismatch of the optical element and substrate; allowing the use of high Tg material with high modulus for the optical element; allowing the use of high crosslinking density material for the optical element; reducing edge damage at the substrate and optical element; reducing entry points for moisture in humid environment for the substrate and optical element outer perimeter.

In its broad and varied embodiments, disclosed herein is an article, such as optical device 10. The optical device 10 comprises a substrate 12 having a first surface and a second surface opposite the first surface. An optical element 14 is on the first surface of the substrate 12. The optical element 14 comprises an optics region 16. The first surface of the substrate 12 includes an outer region 18 that extends a distance, C, past the periphery 20 of the optics region 16, as shown in FIG. 1. The optical device 10 of FIG. 1 can be a singulated, optical device (e.g., an optical device diced or separated from a larger source substrate), as will be described in greater detail below.

In an aspect, the optical element 14 further comprises an edge region 22 on the outer region 18 of the substrate 12. The edge region 22 extends partially or completely around a periphery 20 of the optics region 16. The edge region 22 has an edge thickness, B, that is less than a thickness, A, which can be the overall thickness, of the optics region 16. As an example, a ratio of the edge thickness B to the optical element thickness, A, ranges from about 0 to about 0.95, such as about 0.01 to about 0.5, about 0.05 to about 0.2, or about 0.5 to about 0.1. The thickness, B, that is selected can depend on the width of the edge region 22 and the materials being employed, among other things. As an example, the edge thickness B can range from 0 (i.e., no optical element material is on the outer region 18) to about 100 microns, such as about 0.01 micron to about 30 microns, or about 0.1 micron to about 10 microns, or about 1 micron to about 8 microns. In an aspect, the edge thickness, B, is substantially or completely uniform across the edge width, C, where the term "substantially" allows for variations in thickness of about 15%, relative to the thickness of the outer most edge of edge region 22. In an example, edge thickness, B, has variations in thickness of 10% or less, relative to the thickness of the outer most edge of edge region 22.

The introduction of a functional edge (e.g., edge region 22), including variations described below, can reduce and displace the maximum stress toward an inside of the device away from the outer dimensions and corners of the optical device, where otherwise the stress maxima would be located. This can lower the overall stress load on the optical device during singulation of the source substrate (e.g., a wafer) into the final substrate dimensions (e.g., a die), and in a packaged optical device, reducing the defects occurring in real world operation as simulated by accelerated thermal cycling tests.

The functional edge can enable the manufacturing and use of articles, such as optical devices (e.g., such as any of the optical devices described herein) that would otherwise not meet electronics and automotive (AEC) testing specifications: e.g., 1000 cycle tests, such as −40° C. to 85° C. thermal cycling according to MIL STD 883H Method 1010.8 and −40° C. to 125° C. AEC Power Temp Cycle test; and/or 85° C./85% RH (relative humidity) 1000 h testing.

In an aspect, the substrate 12 comprises a first material having a first coefficient of thermal expansion ("CTE") and the optical element 14 comprises a second material having a second coefficient of thermal expansion, wherein the first coefficient of thermal expansion is different than the second coefficient of thermal expansion. For example, the difference between the first coefficient of thermal expansion and the second coefficient of thermal expansion can range from 0.1 to 100 ppm/K, such as, for example, from about 1 to about 20 ppm/K, or about 5 to about 10 ppm/K.

The substrate can comprise any suitable materials that are transparent, provide adequate structural support for the optical element and are transparent in the radiation wavelengths in which the optical device 10 is intended to be employed, such as one or more of ultraviolet, visible, and infrared wavelengths (e.g., wavelengths ranging from 200 nm to 3000 nm). In an aspect, suitable materials can be organic or inorganic transparent materials with a CTE ranging from 0.5 to 100 ppm/K. Examples of suitable materials include glass, such as borosilicate glass, alkali or alkali-free glass (e.g., alkali or alkali-free borosilicate glass) and metal oxide glass; silicon, hydrogenated silicon, germanium and transparent polymers.

The substrate 12 of the optical devices can have any suitable thickness, S, and width, W. Additionally, the ratio of thickness, A, of the optical element 14 to the total thickness, A+S, of the optical device 10 ranges from about 0.001 to about 1 such as about 0.01 to about 0.8, or about 0.1 to about 0.5. Additionally, a ratio of the edge width, C, to the overall width, W, of substrate 12 ranges from about 0.001 to about 0.999, such as 0.01 to about 0.5, such as about 0.05 to about 0.2.

Figure 7:
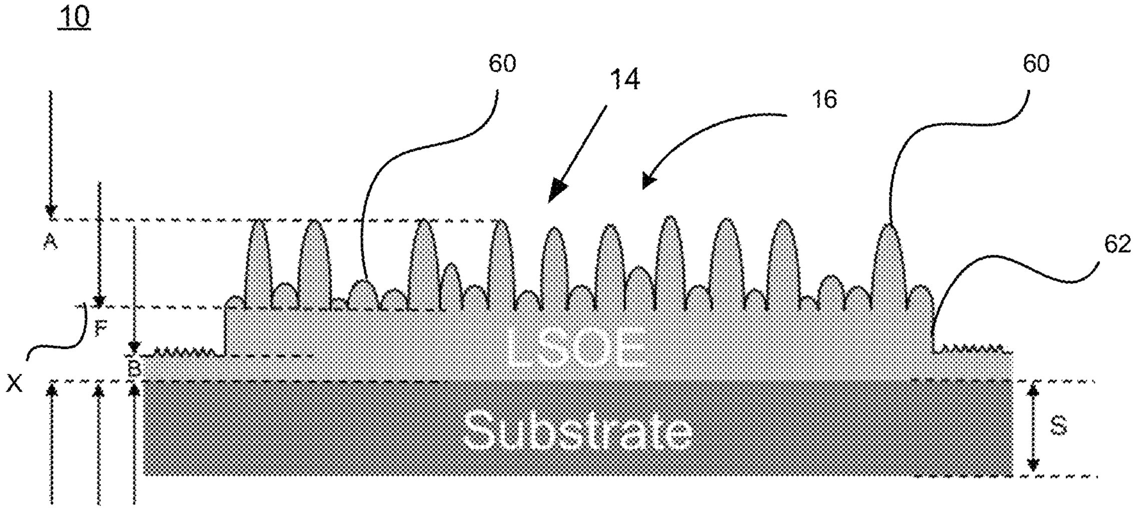
FIG. 7 illustrates a schematic cross-sectional view of an optical device, according to an aspect of the present disclosure.

The optical element 14 can comprise any optically transparent organic or inorganic optical element material. The term "optically transparent" means transparent in the radiation wavelengths in which the optical device is intended to be employed, such as one or more of ultraviolet, visible, and infrared wavelengths (e.g., wavelengths ranging from 200 nm to 3000 nm). The optical element material can optionally be used as a matrix for including within its volume at least one additional optical material. The material for the optical element 14 can be formed and/or take a shape that includes a surface profile, such as surface profile 60 for an optical device 10, such as a diffuser as illustrated in FIG. 7, or any other desired surface profile 60 that provides a desired optical function.

The optical element 14 material can be, for example, any curable polymer. Non-limiting examples of suitable optical element materials include thermoplastics, such as polyesters, polyolefins, polycarbonates, polyamides, polyimides, polyurethanes, acrylics, acrylates, polyvinylesters, polyethers, polythiols, silicones, fluorocarbons, and various co-polymers thereof; thermosets, such as epoxies, polyurethanes, acrylates, melamine formaldehyde, urea formaldehyde, and phenol formaldehyde; energy curable materials, such as acrylates, epoxies, vinyls, vinyl esters, styrenes, and silanes; and combinations thereof. Additional optical element materials include, but are not limited to, silanes, siloxanes, titanates, zirconates, aluminates, silicates, phosphazanes, polyborazylenes, and polythiazyls.

In an aspect, the polymer chains of an optical element 14 material can be cross-linked using a polymerization technique to cure the polymer. Non-limiting examples of a polymerization techniques include photoinduced polymerization, such as free radical polymerization, spectrally sensitized photoinduced free radical polymerization, photoinduced cationic polymerization, spectrally sensitized photoinduced cationic polymerization, and photoinduced cycloaddition; electron beam induced polymerization, such as electron beam induced free radical polymerization, electron beam induced cationic polymerization, and electron beam induced cycloaddition; and thermally induced polymerization, such as thermally induced cationic polymerization. In an aspect, the optical element 14 material can be deposited on the substrate 12 or formed in a mold having a negative surface profile, and then cross-linked and/or cured using a technique such as a non-radical cure system, an ultraviolet light, a visible light, an infrared light, heat, chemical-induced and/or an electron beam.

The additional optical material can provide optical functions that are not provided by the optical element material or the surface profile alone. Non-limiting examples of properties include, but are not limited to, light scattering, electrical and/or magnetic properties, fluorescent properties, IR to visible light converting properties (low energy incident light creates higher energy), electrochromic, thermochromic, wavelength dependent absorption, thin film interference, diffractive interference, polarization control, and combinations thereof.

The at least one additional optical material can be present in an organic phase, an inorganic phase, or a gas phase. The at least one additional optical material can be in a form of a particle (nanoparticle or microparticle), a rod, wire, fibers, filaments, ribbons, elliptical, other shapes, and combinations thereof. In an aspect, the at least one additional optical material can be an assembly of particles in which a particle size ranges from about 20 nm to about 1000 nm, for example, from about 30 nm to about 900 nm, and as a further example from about 40 nm to about 800 nm. In an aspect, the at least one additional optical material can be present in the optical element material as embedded particles (randomly or specifically placed) within the volume of the optical element material, as a particle layer within the optical element material, or as particles on the surface profile 60 of the optical element material.

The at least one additional optical material can be a metallic material. Non-limiting examples of a metallic material include aluminum, palladium, silver, titanium, iron, cobalt, copper, tin, gold, nickel, their alloys; metal compounds involving carbon, oxygen, nitrogen, and their combination; and combinations thereof.

The at least one additional optical material can be an inorganic, non-metal material. Non-limiting examples of a suitable inorganic non-metal material include metal oxides such as $SiO_2$, $TiO_2$, $Al_2O_3$, $ZrO_2$, $WO_3$, $VO_5$, ITO, $Ta_2O_5$, $CeO_2$, $Y_2O_3$, ZnS, ZnO, $In_2O_3$, $La_2O_3$, MgO, $Nd_2O_3$, $Pr_6O_{11}$, $Fe_2O_3$, $Fe_3O_4$, SiO, $SnO_2$ and $FeO_x$; metal fluorides such as $MgF_2$, $AlF_3$, $CeF_3$, $LaF_3$, LiF and $CaF_2$; cermets, diamond-like carbon, and combinations thereof. Metal oxides can be noted as MOx in which M is a metal, O is oxygen, and x can be a fraction, when used in a non-stoichiometric compound.

The at least one additional optical material can be an absorbing material capable of acting as a uniform or selective absorber at different wavelength. Non-limiting examples of an absorbing material include carbon, graphite, silicon, germanium, cermet, metals mixed in a dielectric matrix, Inconel, stainless steel, hastelloys, and combinations thereof.

The at least one additional optical material can be an organic colored material. Non-limiting examples of an organic colored material include perylene, perinone, quinacridone, quinacridonequinone, anthrapyrimidine, anthraquinone, anthanthrone, benzimidazolone, disazo condensation, azo, quinolones, xanthene, azomethine, quinophthalone, indanthrone, phthalocyanine, triarylcarbonium, dioxazine, aminoanthraquinone, isoindoline, diketopyrrolopyrrole, thioindigo, thiazineindigo, isoindoline, isoindolinone, pyranthrone, isoviolanthrone, miyoshi methane, triarylmethane, and mixtures thereof.

The at least one additional optical material can be a liquid crystal polymer. The liquid crystal polymer (LCP) can be one or more solidified polymeric liquid crystal components. The LCP can have a color that depends on the viewing angle, and can be composed of oriented, three-dimensionally cross-linked substances of liquid-crystalline structure with a chiral phase. The LCP structures can be obtained by subjecting one or more three-dimensionally cross-linkable liquid-crystalline substances with a chiral phase to orientation, then to three-dimensional crosslinking, and subsequently to comminution to the desired particle size. The LCP structures obtained are platelet-like particles comprising the cross-linked substance of a liquid crystal structure (i.e., the polymeric or monomeric fluid prior to crosslinking was in an ordered state of the liquid crystal type). Alternatively, the LCP structures can be formed by coating platelet-like particles with a liquid crystal material. The LCP structure can be made from a precursor composition comprising at least one nematic compound and at least one chiral dopant compound.

The dimensions and materials taught for the optical devices of FIGS. 1 and 7 can be applied to any of the optical devices described herein. For example, the ratio/ranges taught for A, B, C, S, W, and F (where F is shown in FIG. 7 and discussed below), the materials employed for the substrate 12 and optical element 14, and the methods of making these layers, as taught for the optical devices illustrated in FIGS. 1 and 7, can apply to any of the optical devices described herein.

Figure 4:
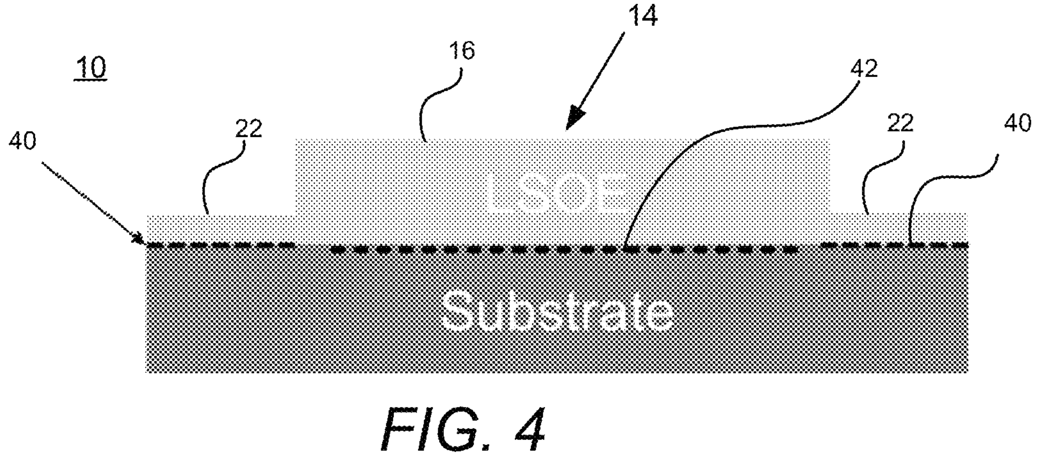
FIG. 4 illustrates a schematic cross-sectional view of an optical device, according to an aspect of the present disclosure.

The optical element 14 can be attached to substrate 12 in any suitable manner. In an aspect, as illustrated in FIG. 4, optical element 14 is adhered to the substrate 12 by adhesion features 40 and 42, respectively disposed between the edge region 22 and substrate 12, and between the optics region 16 and substrate 12. In an aspect, the adhesion feature 40 between the edge region 22 and substrate 12 is enhanced (i.e., provides stronger adhesion) compared to an adhesion feature 42 between the optics region 16 to the substrate 12. In another aspect, both the adhesion feature 40 and adhesion feature 42 are enhanced so as to provide the same or similar adhesion strength. In an aspect, a ratio of an adhesion feature area (e.g., the total area of adhesion features 40 and/or 42) to a surface area of the first surface of the substrate 12 ranges from about 0.001 to about 1, such as about 0.01 to about 0.8, or about 0.1 to about 0.5. An adhesion feature in the area of the substrate positioned between the edge region 22 and the substrate 12 can improve reliability by preventing early delamination of the optical element 14 (e.g., LSOE) outer perimeter. The adhesion feature can be formed by, for example, physical, chemical, or mechanical methods of increasing local roughness of the surface of the substrate 12 on the nano- and microscale scale prior to deposition of the optical element 14, and/or by increasing the number of chemical bonds on the interface between the substrate 12 and the edge region 22 of the optical element 14. In an example, one or both of the regions 40 and 42 of the substrate 12 have a surface roughness that is sufficient to enhance adhesion. For example, the surface roughness can range from about 0.001 um to about 5 μm, such as about 0.1 um to about 3 um, or about 0.5 um to about 2 um. Any of the optical devices 10 described herein can include one or both of adhesion features 40 and 42 as described herein.

Figure 5:
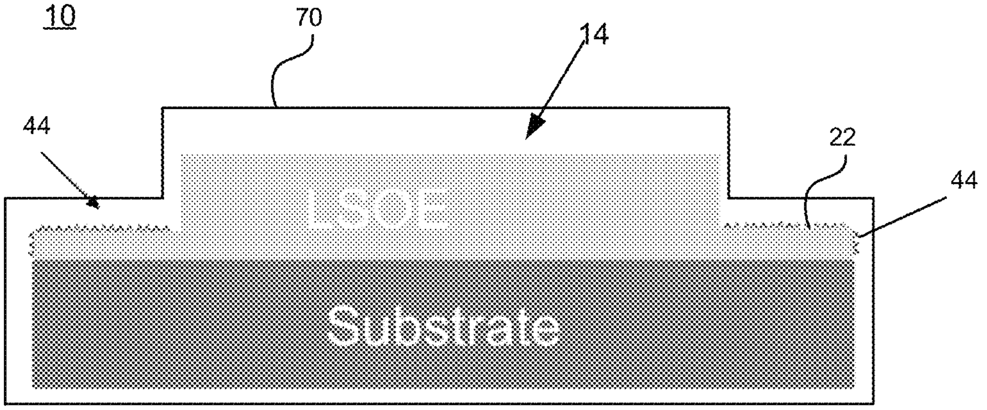
FIG. 5 illustrates a schematic cross-sectional view of an optical device, according to an aspect of the present disclosure.

Referring to FIG. 5, an optical device 10 can optionally be attached to (e.g., encapsulated in or fixed to) a packaging 70. The packaging 70 can be in the form of a subassembly structure and/or one or more protective layers, as is well known in the art. An adhesion feature as illustrated by roughened regions on outer surface 44 of the optical element 14 in FIG. 5. The adhesion features can be formed by increasing surface roughness on outer surface 44 compared to the same surface prior to forming the adhesion features.

For example, the increased surface roughness can range from about 0.001 um to about 5 um, such as about 0.1 um to about 3 um, or about 0.5 um to about 2 um. Such adhesion features can further improve bonding of the optical device 10 to the device package 70 and/or improve reliability as compared to devices formed without such an adhesion feature. The adhesion feature can be provided by physical, chemical, and mechanical methods of increasing local roughness, and/or by increasing the number of chemical bonds on the top surface of the edge region 22 to the device package 70. Any of the optical devices 10 described herein can include such adhesion features so as to enhance adhesion to the packaging 70 in a manner similar to that described for the device of FIG. 5.

In an aspect, as mentioned above, the optical device 10 is a diffuser or other device in which the optics region 16 has a non-uniform thickness. The diffuser or other device can employ any of the optical element 14 materials and/or substrate 12 materials described herein. The optical element 14 can include a bottom surface, such as a planar surface, that can interface with the first surface of a substrate 12; and a surface with a surface profile 60, as shown in FIG. 7. The surface profile 60 can be any profile that will provide the desired function (e.g., a diffuser profile and/or light shaping profile) and can be in the form of, for example, a random surface profile, a periodic surface profile, a patterned surface profile, or a combination of such profiles. The surface profile 60 can be created by methods such as stamping, embossing, molding, or reactive-ion etching, as is well known in the art. In an aspect where the optical device 10 is a diffuser or other device in which the optics region 16 has a non-uniform thickness, the optics region 16 can have a base layer thickness, F, that is less than an overall thickness, A, of the optics region 16. The base layer is a portion of optics region 16 between the substrate 12 and an imaginary plane (represented in part by the dashed line, X, in FIG. 7) that lies parallel with the first surface of substrate 12 and that is adjacent a surface of the profile 60 that is closest to the first surface of substrate 12. As an example, the ratio of the edge thickness, B, to the base layer thickness, F, ranges from about 0 to about 0.95. As other examples, the values for the ratio B:F can be the same as any of the values disclosed herein for the thickness ratios B: A of FIG. 1, with the understanding that in the case of a diffuser or other device, in which the optics region 16 has a non-uniform thickness, the overall thickness, A, may generally be greater than the thickness F of the base layer.

As described herein, introducing the edge region 22 protects the article, such as any of the optical elements described herein, from damage by reducing stresses within the optical device 10. The thickness ratio B/A and the width C can be selected to allow for adjusting stress distribution at the interface of the optical element to the substrate. Depending on the substrate thickness, S, the stress due to material mismatch between the optical element 14 and the substrate 12 can be effectively reduced to allow wider processing and operating ranges. Similarly, with respect to FIG. 7, the optical element 14 with the overall thickness A, and thickness ratio F/A can be protected by specially selecting the ratio B/F with B<F, and the width C to allow for adjusting stress distribution at the interface of the optical element 14 and the substrate 12.

Figure 2:
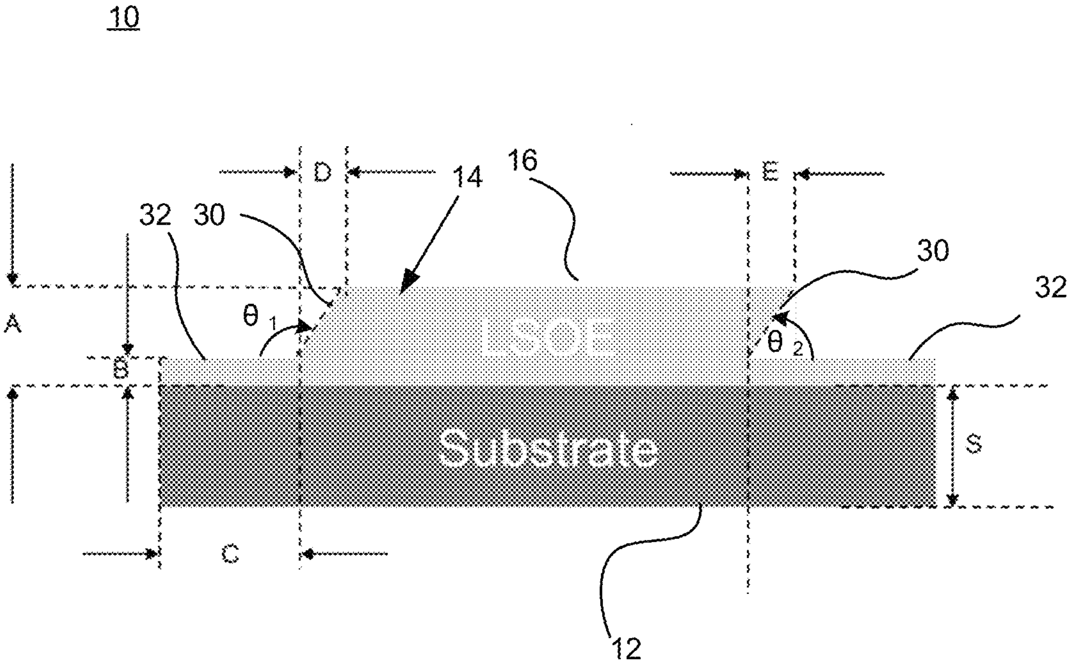
FIG. 2 illustrates a schematic cross-sectional view of an optical device, according to an aspect of the present disclosure.
Figure 3:
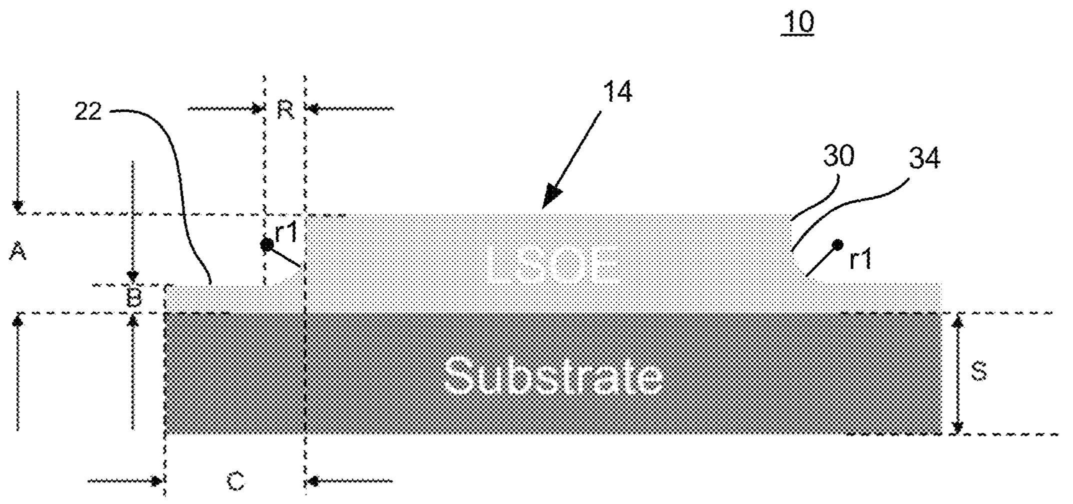
FIG. 3 illustrates a schematic cross-sectional view of an optical device, according to an aspect of the present disclosure.

Referring to FIGS. 2 and 3, any of the optical devices 10 described herein can comprise a transition region D, E or R between the edge region 22 and the optics region 16, where the transition region D or E can include at least one of a sidewall 30 of angle, θ, and the transition region R can include a radially curved surface 34. As illustrated in FIG. 2, the sidewall 30 can be angled relative to a plane 32 of the edge region 22. For example, the sidewall 30 can have an angle, θ, ranging from about 5 degrees to about 175 degrees, from the plane 32. FIG. 2 shows both an obtuse angle for $\theta_1$ (on the left side of optics region 16) and an acute angle for $\theta_2$ (on the right side of optics region 16). However, the entire edge region 22 can have either one or the other of an acute or obtuse angle, (e.g., θ can be the same for the entire edge region) if desired. Alternatively, any portion of the edge region 22 can be an obtuse, acute or a 90° angle for θ, as desired. Employing a transition region D or E between the edge region 22 and the overall thickness A (in the case of an optical element 14 with uniform thickness, such as in FIG. 1) or base layer thickness F (in the case of an optical element with non-uniform thickness, such as in FIG. 7) of the optical element 14 can move the stress maximum further away from the substrate edge, thereby reducing the risk of cracking at the edge, as compared with the optical device of FIG. 1. Any of the optical devices 10 described herein can have a transition region D or E comprising a sidewall 30 having an angle, θ, with the ranges as described herein for FIG. 2.

As illustrated in FIG. 3, the transition region R can include a radially curved surface 34 between the edge region 22 and the sidewall 30 of the optics region 16. The radius, r1, of the curved surface 34 can be either constant or variable (e.g., changing from start to the end of the transition). Employing a radial transition, R, to each of the thickness, A (FIG. 1) or thickness F (FIG. 7) of the optical element 14 can additionally reduce stresses by reducing or minimizing the stress peak as compared with a stress peak that would be realized with a sharp edge, such as a 90 degree angle or other angle θ as seen in FIGS. 1 and 2, respectively, and can thereby provide further stress distribution compared to the structures of FIGS. 1 and/or 2. Any values for r1 that provide a desired stress reducing effect can be employed. Values for r1 can range, for example, from about 1 micron to about 100 microns. Any of the optical devices 10 described herein can include a transition region R comprising a radially curved surface 34.

Figure 6:
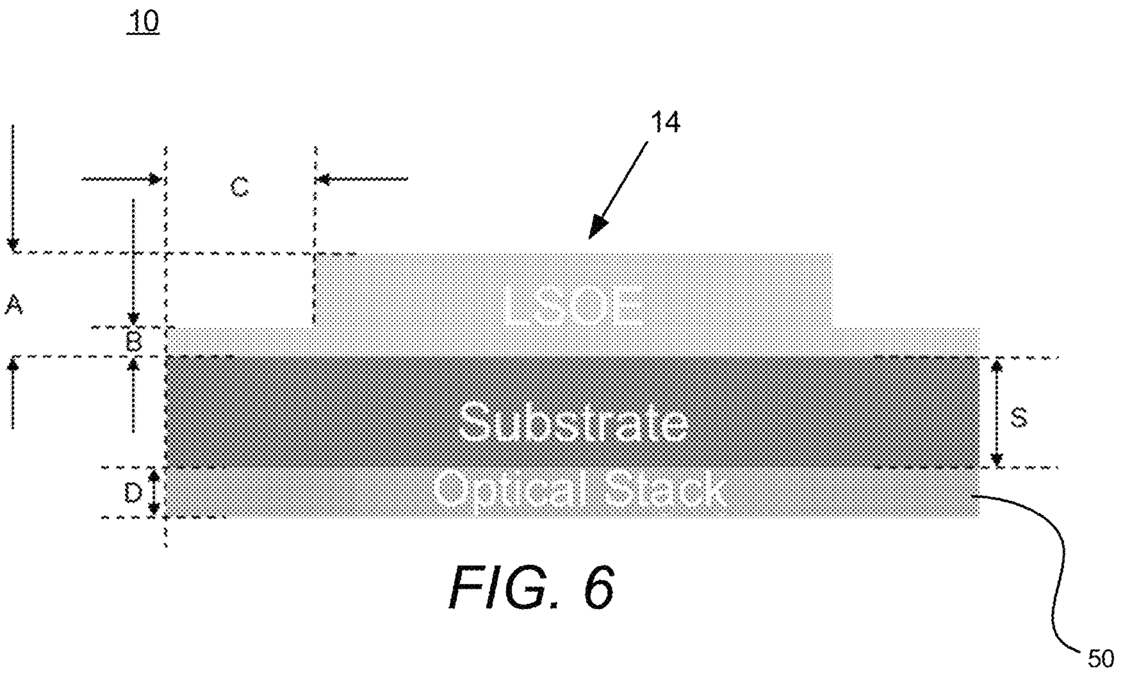
FIG. 6 illustrates a schematic cross-sectional view of an optical device, according to an aspect of the present disclosure.

As illustrated in FIG. 6, the optical device 10 can further comprise an optical stack 50 comprised of one or multiple layers on the second surface of the substrate 12. The optical stack 50 can comprise one or multiple layers of any suitable materials, including layers chosen from optical filters, anti-reflective layers, light coupling layers and stress reducing layers. Techniques for making and using such layers to form optical stacks are well known. In an aspect, the optical stack can comprise a single or multiple layers of the same material as the optical element 14, such as any of the materials described herein for optical element 14. The optical stack 50 can be, for example, a single flat layer with no structure. The thickness ratio of the thickness, D, of the optical stack 50 to the thickness, A, of the LSOE optics region 16, can be any suitable thickness ratio that will provide the desired optical and mechanical functions, such as, for example, wavelength filtering and/or stress balancing. Such a thickness ratio for D:A can range, for example, from about 0.1 to about 1.

The optical stack 50 on the second surface (e.g., backside) of the substrate 12 can further reduce curvature of the article due to stresses caused by crosslinking and/or thermal mismatch (e.g. between the LSOE optical element 14 and the substrate 12). Reducing the stress induced curvature can, in turn, further reduce risk of cracking and/or delamination of the optical device 10 compared to devices made without optical stack 50. Any of the optical devices 10 described herein can include an optical stack 50.

Figure 8A:
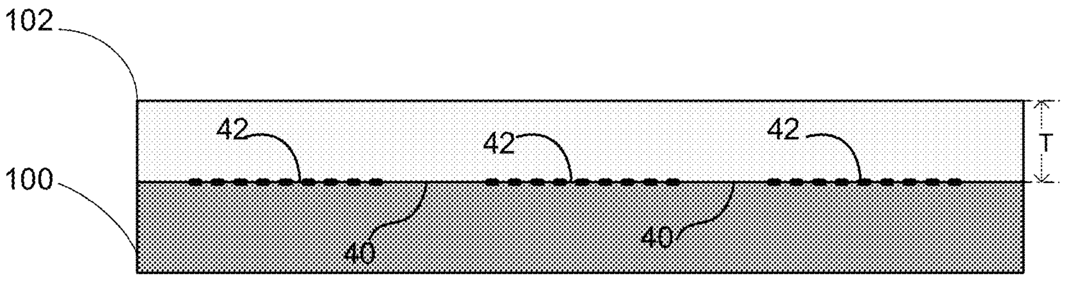
FIGS. 8A to 8C illustrate a method of making optical devices, according to an aspect of the present disclosure.

The present disclosure is also directed to a method of making a plurality of articles on a substrate. In an aspect, referring to FIGS. 8A to 8C, the method comprises depositing a layer for forming a plurality of optics regions on a first surface of a substrate, each of the optics regions corresponding to one of the plurality of articles. The substrate 100 can comprise any of the materials disclosed herein for substrate 12. The layer 102 can comprise any of the materials described herein for optical element 14. In an aspect, the layer 102 can be an optically transparent material.

In an aspect, the layer 102 has a uniform thickness, T, which can be any desired thickness. For example, T can range from about 10 microns to about 200 microns. Prior to depositing layer 102, an adhesion treatment can optionally be carried out by, for example, physical, chemical, or mechanical methods of increasing local roughness on the nanoscale of areas 40 (shown as not dotted) and/or 42 (shown as dotted) of source substrate 100, and/or by increasing the number of chemical bonds on the interface between the source substrate 100 and the edge region 22 of the optical element 14.

Figure 8B:
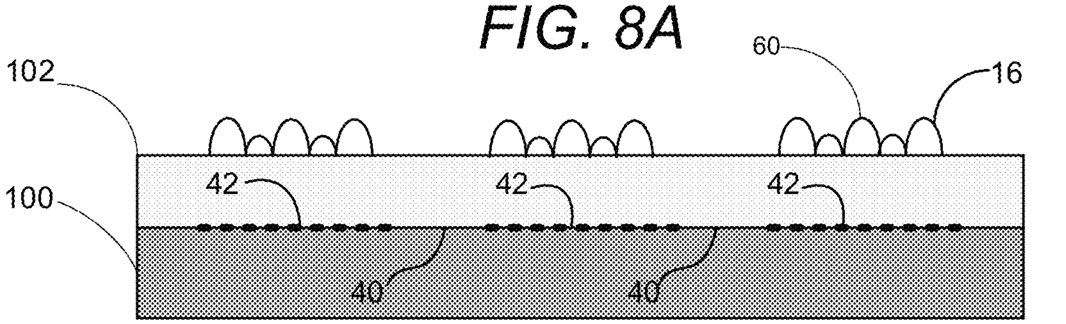

Referring to FIG. 8B, further processing can optionally be carried out to form surface profiles 60 for the plurality of optics regions 16 in the layer 102. The optics regions 16 can have a thickness and an optical functionality, and can be the same as any of the optics regions described herein. If further processing is not carried out, the optics regions 16 for the finished devices can comprise a uniform thickness, A (FIG. 1) that is equal to the thickness, T, of the layer 102.

Figure 8C:
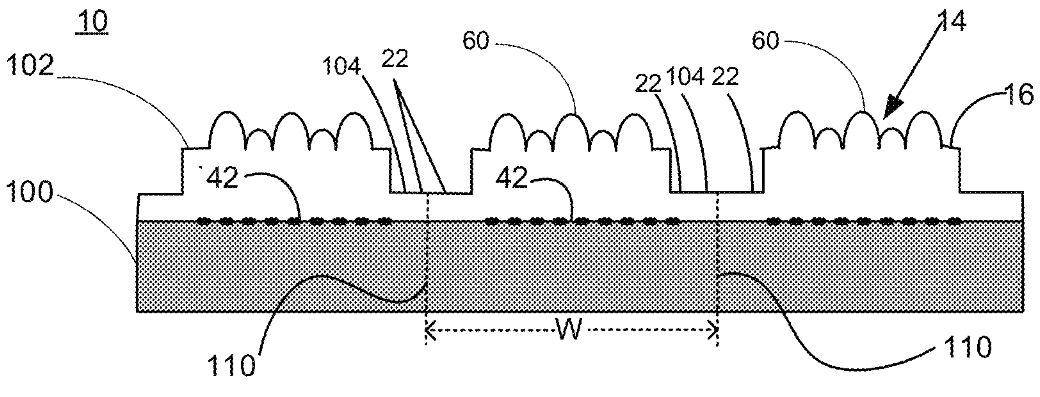

Referring to FIG. 8C, the method further comprises thinning a portion of the layer 102 to form thinned areas 104 between the plurality of optics regions. The thinning can remove all or a portion of the layer 102 in the thinned areas 104. The thinning can be carried out by any suitable technique for removing the material of layer 102, such as, for example, mechanically cutting a channel (e.g., using a blade, such as a saw blade, or other mechanical device), laser removal, chemical etching, applying a mold prior to curing, or a combination of such techniques.

In an aspect, where the material of layer 102 comprises a polymer, the polymer chains of the optical element material can be crosslinked using a polymerization technique to cure the polymer. The crosslinking and curing can occur at any desired time during the manufacturing of the optical element, such as after formation of surface profiles 60 of the optics region, which can first be formed by employing a mold on the uncured material of layer 102 to provide the desired surface profiles. In an aspect, a mold can also be employed to form the thinned regions 104. This can occur at a different time as the formation of the surface profiles 60, such as can be illustrated in FIGS. 8B and 8C. Alternatively, a mold can be employed to form the thinned regions 104 simultaneously with the surface profiles 60 of the optics region. The crosslinking and curing can occur simultaneously with, or after, the molding of the surface profiles and/or the thinned regions.

Non-limiting examples of a polymerization techniques include photoinduced polymerization, such as free radical polymerization, spectrally sensitized photoinduced free radical polymerization, photoinduced cationic polymerization, spectrally sensitized photoinduced cationic polymerization, and photoinduced cycloaddition; electron beam induced polymerization, such as electron beam induced free radical polymerization, electron beam induced cationic polymerization, and electron beam induced cycloaddition; and thermally induced polymerization, such as thermally induced cationic polymerization. In an aspect, the material of layer 102 can be deposited on the substrate 12 or formed in a mold having a negative surface profile, and then cross-linked and/or cured using a technique such as a non-radical cure system, an ultraviolet light, a visible light, an infrared light, heat, chemical-induced and/or an electron beam.

The thinned areas 104 can comprise an outer surface (e.g. corresponding to an outer surface 44 of the edge region 22 of FIG. 5) that is processed to provide a desired surface roughness that is sufficient to enhance adhesion to packaging to which the optical devices may subsequently be attached, according to an aspect of the present disclosure. For example, the surface roughness can range from about 0.025 um to about 500 um. The adhesion enhancement can be provided by physical, chemical, and mechanical methods of increasing local roughness, and/or by increasing the number of chemical bonds on the thinned regions 104. The surface of the thinned regions can be roughened using any suitable method, such as by bringing the surface in contact with a blade (e.g., saw blade) or other abrasive device. A benefit of using a mechanical blade to thin the edge region 22 is that the surface can simultaneously be roughened as the optical element material is removed. The blade employed can be chosen to provide the desired roughness.

After thinning, the method can further comprise severing the source substrate 100 and any remaining portion of layer 102 in the thinned areas 104 to form singulated optical devices 10, as shown, for example, in FIGS. 1 to 7. The severing can occur at, for example, the dashed lines 110 in FIG. 8C. The severing can be carried out by any suitable technique, such as dicing techniques, examples of which are well known in the art. The width of the material removed in the severing process is less than the width of the thinned regions so as to provide for edge regions 22 in the singulated optical devices 10. Thus, each of the singulated optical devices 10 includes an outer region of the substrate that extends a distance past the periphery of the optics region by an edge width, C, as described herein. The edge region 22 can extend partially or completely around a periphery of the optics region 16 of the singulated optical devices 10. The edge region 22 has an edge thickness, B, that is less than the thickness, A, of the optics region 16. The dimensions (e.g., for A, B, C, S, W, F and θ), the materials employed for the substrate 12 and optical element 14, and the methods of making these layers can be the same as those taught for any of the optical devices described herein.

In an aspect, the singulated optical devices 10 described herein have reduced material mismatch stress between the optical element 14 and the substrate 12 compared to a second optical device that: i) has a substrate with the same dimensions as the first optical device, and ii) that is otherwise the same as the first optical device except that that the optical element does not include edge regions 22, as described herein, in which the optical element has been thinned or entirely removed from the substrate between the plurality of optics regions.

The present disclosure is also directed to a wafer 112 comprising the source substrate 100 and layer 102 comprising thinned regions 104 and a plurality of optics regions 16, such as shown, for example in FIG. 8C (prior to singulation). Thus, the wafer 112 can comprise a plurality of optical devices 10 that have yet to be singulated and optionally attached to a packaging 70. The thickness of the thinned regions 104 can be the same as the thickness B of the edge regions 22, and the width of the thinned regions 104 between the optics regions 16 can be at least twice the width, C, of the edge region 22, where the dimensions of the optical devices 10 (e.g., for A, B, C, S, W, F, T and θ) can be the same as described for any of the optical devices, source substrates 100 or layers 102 herein. The substrate 100 can comprise any of the materials disclosed herein for substrate 12. The layer 102 can comprise any of the materials described herein for optical element 14. The optics regions 16 can be the same as for any of the optical devices 10 described herein.

An aspect of the present disclosure is directed to a method of singulating. The singulating method described herein can be employed for singulating optical devices, as illustrated herein, as well as for other devices formed in mass on a substrate. The method comprises: thinning a portion of a layer on a substrate to form thinned areas between a plurality of device regions on the substrate; and severing the substrate in the thinned areas to form singulated devices. The layer can have a different coefficient of thermal expansion (CTE) than the CTE of the substrate, such as a CTE difference within the ranges as described herein. The layer can comprise any organic or inorganic materials. In an aspect, the layer can comprise any of the materials described herein for the optical element 14. As an example, the layer comprises a cross-linked polymer material. The substrate can comprise any organic or inorganic materials. In an aspect, the substrate can comprise any materials described herein for the substrate 12. The device regions can comprise, for example, an optical element, as describe herein, or any other device. The thinning and severing can be carried out by any of the thinning or severing methods described herein. The thinning and severing can result in an outer region, such as an edge region, that extends partially or completely around a periphery of the device region (e.g., the optics region as described herein). The outer region and edge region can be configured similarly as described with respect to any of FIGS. 1 to 7, herein, including having any of the same widths, thicknesses or other dimensions, transition regions such as sidewalls or radially curved surfaces and surface roughness, as disclosed herein. For example, the thickness of the thinned regions can be the same as the thickness B of the edge regions 22 as described herein, and the width of the thinned regions between device regions prior to singulation can be at least twice the width, C, of the edge region 22. The dimensions (e.g., for A, B, C, S, W, F, T and θ) of the resulting singulated devices can be the same as described for any of the optical devices, source substrates 100 or layers 102 herein. Singulated devices made by the singulating method described herein are also contemplated.

EXAMPLES

Example 1: Power Thermal Cycling

Figure 9A:
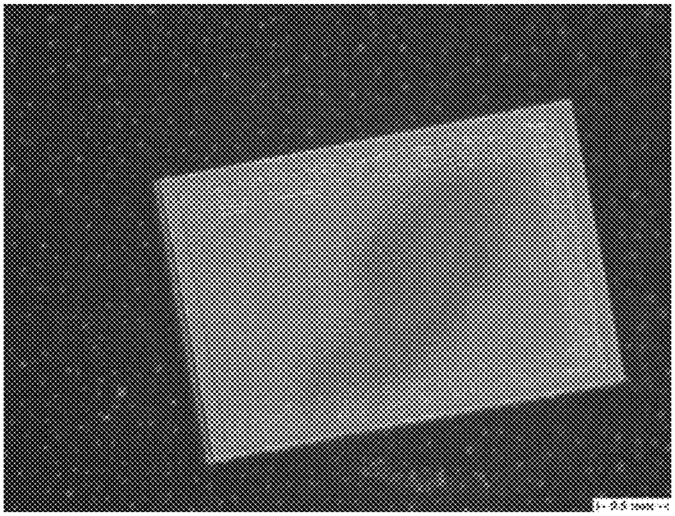
FIG. 9A shows an overhead view of an optical device, according to an example of the present disclosure.

Power Thermal Cycling tests were carried out on an optical device 10 that included a substrate and an optical element on a first surface of the substrate. The optical element included an edge region 22 on the outer region of the substrate that extended completely around the periphery of the optics region (shown as the lighter region around the periphery of the rectangular device in the overhead view of FIG. 9A). The edge region had an edge thickness that was less than a thickness of the optics region and a width of about 100 microns. A −40° C. to 125° C. AEC Power Temp Cycle test was performed on the optical device 10. The optical element passed after 1000 cycles, showing no delamination of the optical element form the substrate.

Comparative Example: Power Thermal Cycling

Figure 9B:
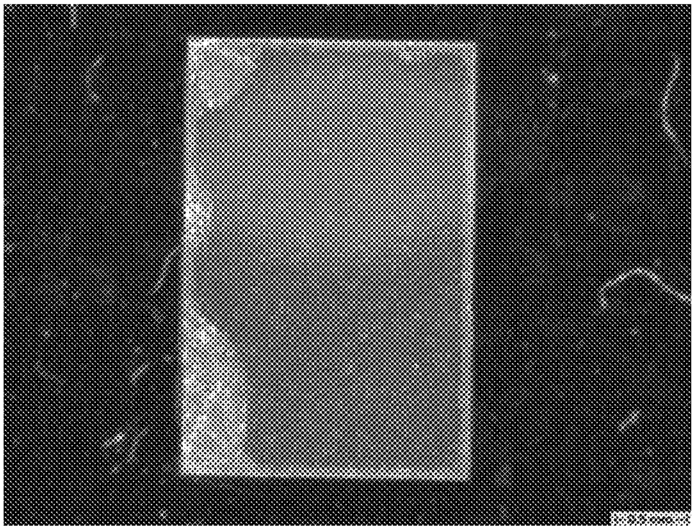
FIG. 9B shows an overhead view of an optical device, according to a comparative example.

Power Thermal Cycling tests were carried out on an optical device similar to that of Example 1 except that no edge region was included on the outer region of the substrate. A −40° C. to 125° C. AEC Power Temp Cycle test was performed on the comparative optical device. The optical element failed after 200 cycles, showing regions of delamination (shown as the lighter region around the entire periphery on all four sides in the overhead view of the device in FIG. 9B). An internal glass crack was visible in the larger delamination region shown near the lower left corner of the device in FIG. 9B.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. An article, comprising:

a substrate having a first surface and a second surface opposite the first surface; and an optical element on the first surface of the substrate, the optical element comprising an optics region, an edge region, and a transition region between the edge region and the optics region, the transition region including a first sidewall having a first sidewall surface angled at a first sidewall angle and a second sidewall having a second sidewall surface angled at a second sidewall angle, and wherein the first sidewall and the second sidewall contain the optical element and wherein the optics region is a diffuser;

wherein the first surface of the substrate includes an outer region that extends a distance past a periphery of the optics region.

2. The article of claim 1, wherein the edge region is on the outer region of the substrate, the edge region extending partially or completely around a periphery of the optics region, the edge region having an edge thickness that is less than a thickness of the optics region.

3. The article of claim 2, wherein a ratio of the edge thickness to the thickness of the optics region ranges from about 0 to about 0.95.

4. The article of claim 3, wherein the edge region has an edge width, wherein a ratio of the edge width to an overall width of the substrate ranges from about 0.001 to about 0.999.

5. The article of claim 4, wherein the edge thickness is substantially uniform.

6. The article of claim 2, wherein an adhesion feature adhering the edge region of the optical element to the substrate is enhanced compared to an adhesion feature adhering the optics region to the substrate.

7. The article of claim 2, wherein an outer surface of the edge region of the optical element has a surface roughness ranging from about 0.025 um to about 500 um.

8. The article of claim 2, wherein the optics region has a base layer thickness that is less than an overall thickness of the optics region, wherein a ratio of the edge thickness to the base layer thickness ranges from 0 to about 0.95.

9. The article of claim 1, further comprising an optical stack on the second surface of the substrate.

10. The article of claim 1, wherein the substrate comprises a first material having a first coefficient of thermal expansion and the optical element comprises a second material having a second coefficient of thermal expansion, wherein the first coefficient of thermal expansion is different than the second coefficient of thermal expansion.

11. A method of making a plurality of articles on a substrate, comprising:

depositing a layer for forming a plurality of optics regions on a first surface of a substrate, each of the optics regions corresponding to one of the plurality of articles;

thinning a portion of the layer to form thinned areas between the plurality of optics regions; and severing the substrate in the thinned areas to form singulated articles, wherein an optical element of each of the singulated articles includes an optics region, an edge region, and a transition region between the edge region and the optics region, the transition region having a first sidewall having a first sidewall surface angled at a first sidewall angle and a second sidewall having a second sidewall surface angled at a second sidewall angle, and wherein the optics region is a diffuser.

12. The method of claim 11, wherein each of the singulated articles include an outer region of the substrate that extends a distance past a periphery of the optics region.

13. The method of claim 12, wherein the optical element of each of the singulated articles further includes the edge region on an outer region of the substrate, the edge region extending partially or completely around a periphery of the optics region, the edge region having an edge thickness that is less than an overall thickness of the optics region.

14. The method of claim 11, wherein the thinned areas have a thickness ranging from about 0 to about 100 microns.

15. The method of claim 11, wherein the articles have reduced material mismatch stress between the optical element and the substrate compared to a second optical device that: i) has a substrate with the same dimensions as a first optical device, and ii) that is otherwise the same as the first optical device except that that the optical element has the same overall thickness over an entire first surface of the substrate.

16. A source substrate comprising a plurality of articles made by the method of claim 11.

17. A method of singulating, comprising:

thinning a portion of a layer to form thinned areas between a plurality of device regions on a substrate; and severing the substrate in the thinned areas to form singulated devices, wherein an optical element of each of the singulated devices includes a transition region having a first radially curved sidewall surface and a second radially curved sidewall surface opposite to the first radially curved sidewall surface.

18. The article of claim 1, wherein the first sidewall angle is obtuse and the second sidewall angle is acute.

19. The method of claim 11, wherein the first sidewall angle is obtuse and the second sidewall angle is acute.

* * * * *